United States Patent [19]

Shukunami et al.

[11] Patent Number: 5,018,079
[45] Date of Patent: May 21, 1991

[54] IMAGE FORMING APPARATUS

[75] Inventors: Hiroshi Shukunami, Yokohama; Yasufumi Tanimoto, Fujisawa; Satoshi Onuma, Kawasaki, all of Japan

[73] Assignee: Kabushiki Kaisha Toshiba, Kawasaki, Japan

[21] Appl. No.: 426,073

[22] Filed: Oct. 23, 1989

[30] Foreign Application Priority Data

Oct. 24, 1988 [JP] Japan .................... 63-267506

[51] Int. Cl.$^5$ .............................. G06K 15/00
[52] U.S. Cl. ...................... 364/519; 364/900; 364/940.62
[58] Field of Search .................. 364/518–520, 364/235 MS, 930 MS, 940.62 MS, 242.95 MS; 346/154

[56] References Cited

U.S. PATENT DOCUMENTS

4,727,589  2/1988  Hirose et al. .................... 382/56
4,786,923  11/1988  Shimizu .................... 346/154

Primary Examiner—Arthur G. Evans
Attorney, Agent, or Firm—Foley & Lardner

[57] ABSTRACT

An image forming apparatus is provided which forms an image on a sheet on the basis of image data selectively received from a plurality of host apparatuses. The image forming apparatus comprises a plurality of input/output ports, connected to the respective host apparatuses for receiving image data from the host apparatuses, keys for setting priority orders of the plurality of input/output ports, memories for storing the priority orders set by the keys, and a CPU for selecting one of the input/output ports in accordance with the priority orders stored in the memories, if image data is received simultaneously from two or more of the host apparatuses, a memory and photosensitive assembly for receiving image data from the input/output ports selected by the keys and for forming an image corresponding to the received image data.

6 Claims, 10 Drawing Sheets

| PRIORITY (PR) | INPUT/OUTPUT NUMBER (#) |
|---|---|
| 1 | #n-1 |
| 2 | #2 |
| 3 | #n |
| ⋮ | |
| n | #1 |

IMAGE FORMING APPARATUS

BACKGROUND OF THE INVENTION

1. Field of the Invention

The present invention relates to an image forming apparatus (e.g., a laser printer or an electronic copying machine) for forming an image in accordance with image data supplied from a host apparatus.

2. Description of the Related Art

Conventionally, an image forming apparatus (such as a laser printer or an electronic copying machine) is connected to a host apparatus (such as a computer or an image reader), and forms an image on a sheet (i.e., an image forming medium) in accordance with image data supplied from the host apparatus. This type of image forming apparatus is expensive and yet it is not often accessed by the host apparatus. Therefore, effective use is not made of the image forming apparatus.

This problem may be solved by providing a multi-port type host interface for the image forming apparatus, so as to permit the image forming apparatus to be accessed by a plurality of host apparatuses. More specifically, the multi-port type interface incorporates a priority circuit that causes the image forming apparatus to be used in accordance with priority orders which are previously assigned to the ports of the interface circuit. If the image forming apparatus is simultaneously accessed by two or more host apparatuses, in other words, if it is simultaneously supplied with image data from two or more host apparatuses, the host apparatuses are selected in accordance with the priority orders and are thus connected to the image forming apparatus in accordance with the degree of emergency. By using the image forming apparatus on this time divisional basis, it is intended that efficient use may be made of the image forming apparatus.

However, in these conventional systems the priority orders assigned to the ports of the multi-port type interface are fixed. Therefore, if the operator wants to alter the priority orders, it is necessary to change the connection of cables. This operation is very troublesome and time consuming. Further, even if the operator wants the image forming apparatus to be temporarily accessed by a particular host apparatus, this cannot be done easily. That is, the operator must first turn off the image forming apparatus and then modify the cable connection, for temporary priority use of the particular host apparatus. Therefore, from a practical standpoint such temporary priority use is impossible.

SUMMARY OF THE INVENTION

Accordingly, it is an object of the present invention to provide an image forming apparatus which permits temporary priority use of a particular host apparatus.

The foregoing and additional objects are attained by providing an image forming apparatus which forms an image on a sheet on the basis of image data selectively received from a plurality of host apparatuses. The image forming apparatus comprises a plurality of input/output ports, connected to the respective host apparatuses for receiving image data from the host apparatuses, keys for setting priority orders of the plurality of input/output ports, memories for storing the priority orders set by the keys, and a CPU for selecting one of the input/output ports in accordance with the priority orders stored in the memories, if image data is received simultaneously from two or more of the host apparatuses, a memory and photosensitive assembly for receiving image data from the input/output ports selected by the keys and for forming an image corresponding to the received image data.

DETAILED DESCRIPTION OF THE PREFERRED EMBODIMENTS

Figure 1:
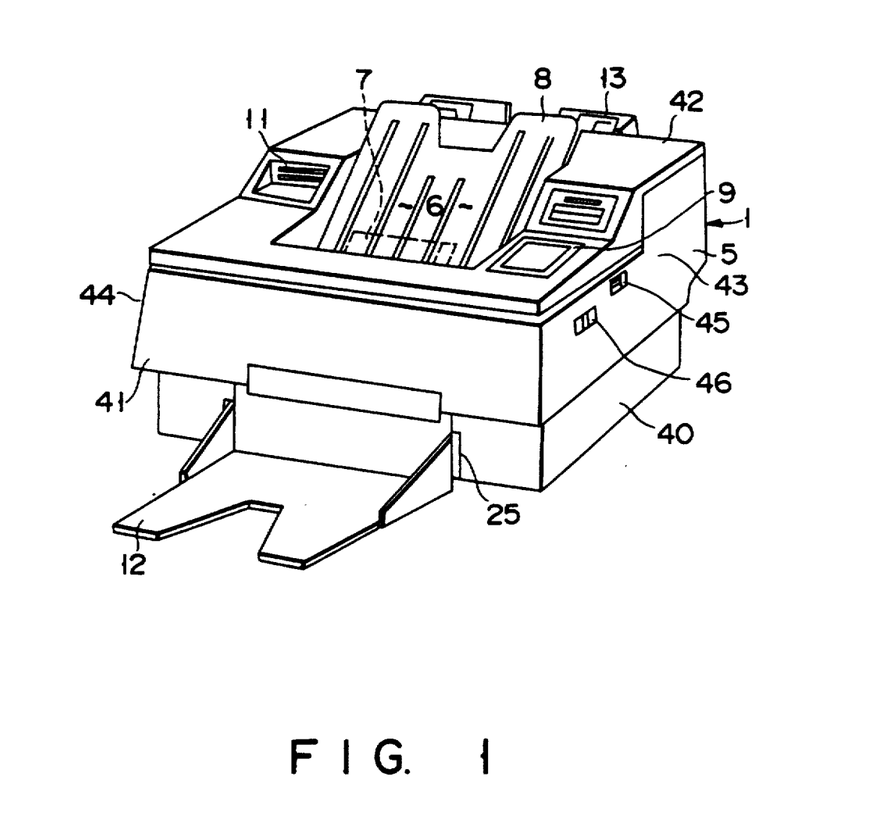
FIG. 1 is a perspective view showing the appearance of a laser printer apparatus (i.e., an image forming apparatus) according to a first embodiment of the present invention.
Figure 2:
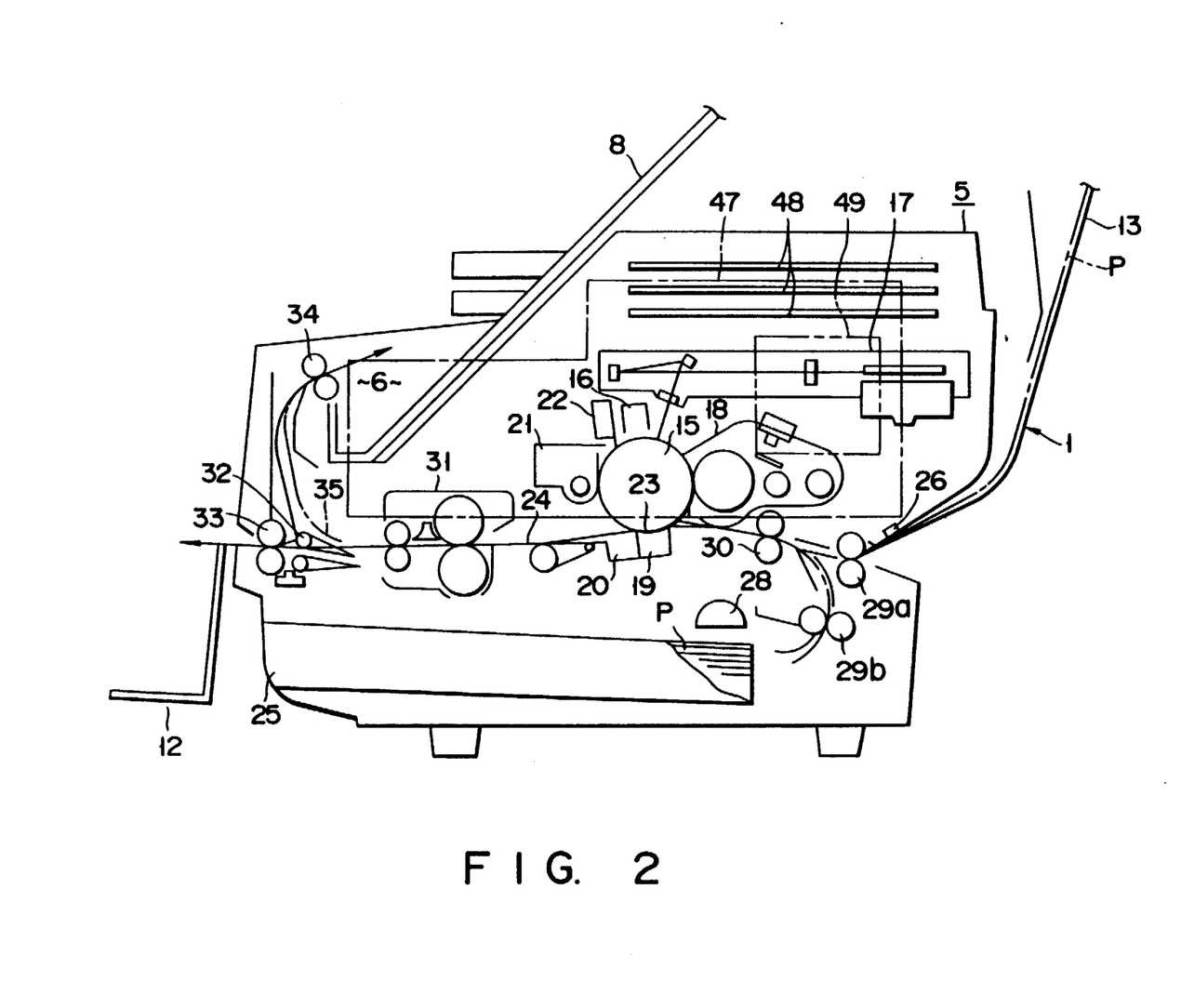
FIG. 2 is a longitudinal sectional view schematically showing the internal construction of the apparatus shown in FIG. 1.

FIG. 1 is a perspective view showing a laser printer apparatus (i.e., an image forming apparatus) according to a preferred embodiment of the present invention, while FIG. 2 is a longitudinal sectional view showing the internal construction of the laser printer apparatus.

Referring to these Figures, laser printer apparatus 1 includes a housing 5. The rear portion of the upper surface of housing 5 is raised, with a slanted portion located between the raised portion and the other portions. In the center of the upper surface, hollow section 6 is located. This hollow section communicates with the interior of housing 5 and serves as a paper discharge section. A paper discharge tray 8 movably supported by jogger 7 is provided in hollow section 6. On the upper surface of housing 5, operating panel 9 is located on the right side of hollow section 6 and three IC card-insertion ports 11 are located on the left side of hollow section 6.

Figure 3:
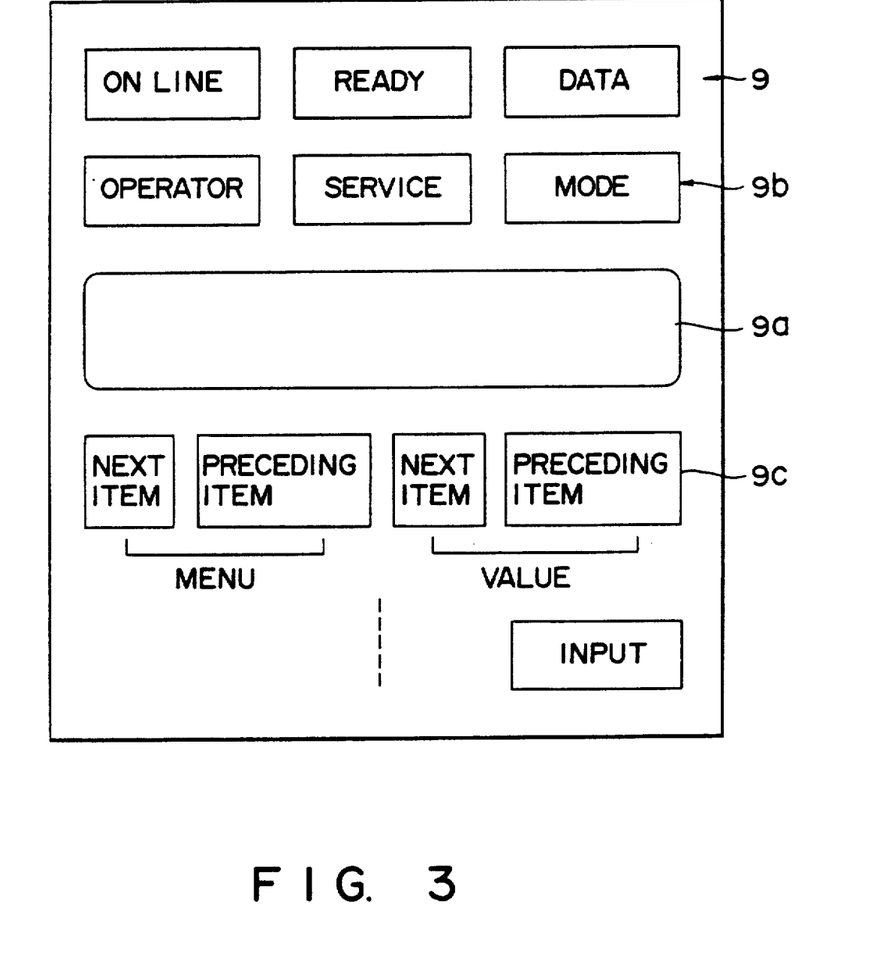
FIG. 3 is a view showing the operating panel of the apparatus.

As is shown in FIG. 3, operating panel 9 (which serves as both a setting means and an interruption means) comprises: LCD 9a (i.e, a liquid crystal display) for indicating the number of copies, the mode of the apparatus 1, guide messages, etc; LED displays 9b for indicating the conditions of apparatus 1 with LEDs (light emitting diodes); and switches 9c for setting apparatus 1. LED displays 9b include: an "ON LINE" display for indicating whether apparatus 1 is in the on-line mode or in the off-line mode (i.e., it indicates whether apparatus 1 is electrically connected to a given external device); a "READY" display for indicating whether or not apparatus 1 is ready for printing; a "DATA" display for indicating whether o not image data is being transferred; an "OPERATOR" display for indicating a request for an operator call; a "SERVICE" display for indicating a request for a service man call; and a "MODE" display for indicating whether apparatus 1 is in the automatic mode or in the manual mode.

Switches 9c include a menu key, a value key, an input key, a ten-key pad (not shown), etc. The menu key is made up of a "NEXT ITEM" key and a "PRECEDING ITEM" key. A plurality of pieces of menu information displayed in the left half of LCD 9a are changed with an increment of 1 upon depression of the "NEXT ITEM" key of the menu key, and are changed with a decrement of 1 upon depression of the "PRECEDING ITEM" key of the menu key. The value key is also made up of a "NEXT ITEM" key and a "PRECEDING ITEM" key. A plurality of pieces of value information displayed in the right half of LCD 9a in correspondence to the menu information are changed with an increment of 1 upon depression of the "NEXT ITEM" key of the value key, and are changed with a decrement of 1 upon depression of the "PRECEDING ITEM" key of the value key. The menu information and the value information are displayed in a cyclical fashion, by operating the respective "NEXT ITEM" and "PRECEDING ITEM" keys. The operator selects a desirable operation mode by operating the menu and value keys and commands the start of the selected operation mode by operating the input key. Further, the operator can enter the value information used for setting the number of copies to be produced.

Paper discharge tray 12 is located at the front of housing 5, and manual insertion tray 13 is located at the rear of housing 5. Paper sheet detector 26 is arranged on the bottom of manual insertion tray 3. If a paper sheet (i.e., a medium on which an image is formed) is inserted from manual insertion tray 13, paper sheet detector 26 detects it and supplies a detection signal to CPU 50 (FIG. 4) to be explained later.

As is shown in FIG. 2, photosensitive body 15, which is in the form of a drum and serves as an image carrier, is located in the center of the internal region of housing 5. Around photosensitive body 15, the following elements are arranged: charging unit 16, laser system 17, developing unit 18, transfer unit 19, separation unit 20, cleaning unit 21, and discharging unit 22. These elements are arranged in the rotating direction of photosensitive body 15 in the order mentioned.

In the inside of housing 5, image support transportation path 24 extends from the rear to the front of apparatus 1, via image transfer section 23 located between photosensitive body 15 and transfer unit 19. Paper sheet P which is automatically supplied from paper sheet cassette 25 by means of paper supply roller 28 and paper feed roller 29b is conveyed to image transfer section 23. Likewise, paper sheet P which is manually supplied from manual insertion tray 13 via paper feed roller 29a is conveyed to image transfer section 23.

In image support transportation path 24, a pair of aligning rollers 30 are arranged on the upstream side of image transfer section 23; and fixing unit 31, discharge paper selector 32 and a pair of paper discharge rollers 33 are arranged on the downstream side of image transfer section 23.

At the terminating end of image support transportation path 24, branch path 35 is provided. Along this branch path, paper sheet P directed thereto by discharge paper selector 32 is conveyed to hollow section 6 (i.e., a paper discharge section). A pair of paper discharge rollers 34 are provided in branch path 35, so as to guide paper sheet P to hollow section 6.

Figure 4:
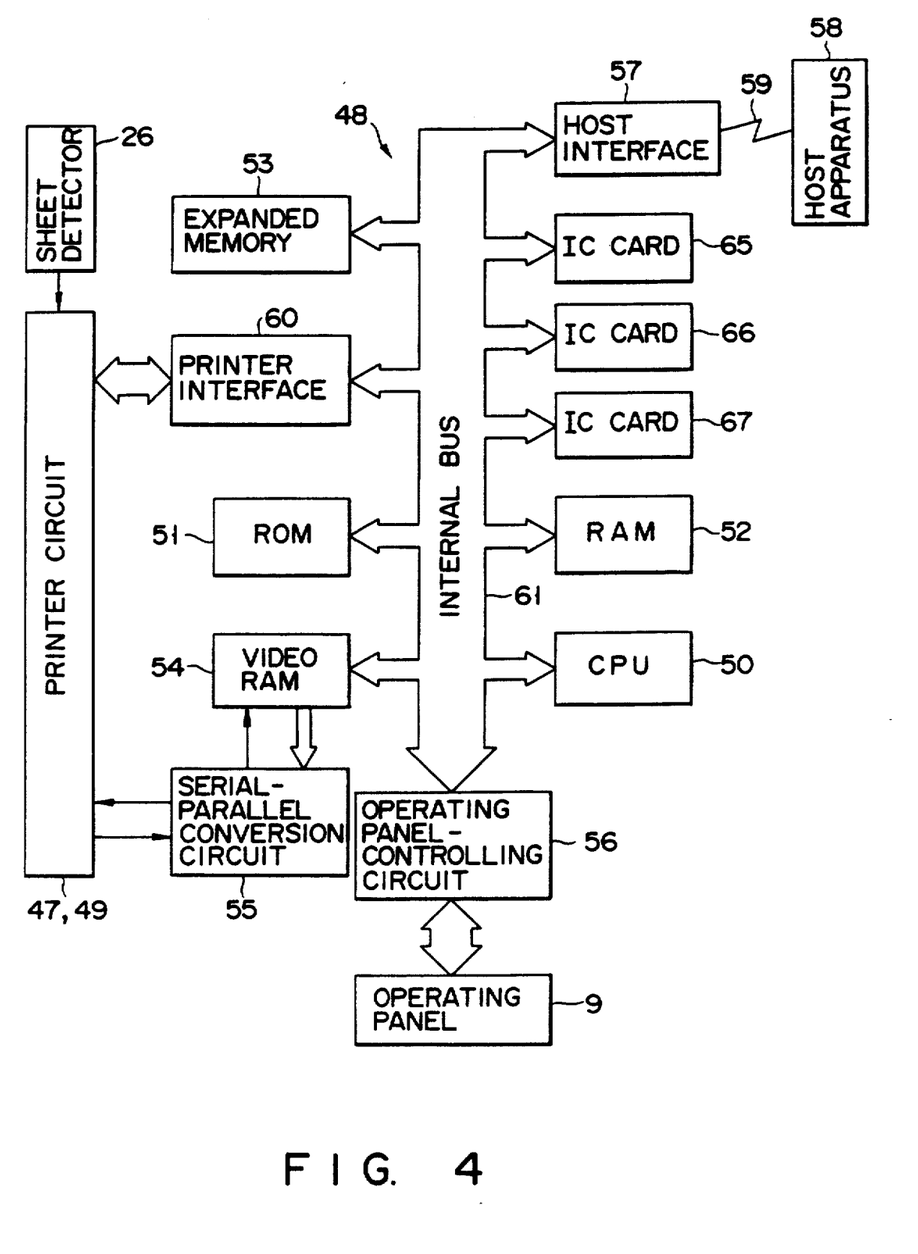
FIG. 4 is a block circuit diagram showing the main portion of the electric circuit of a printer control section.

In FIG. 1, reference numeral 40 denotes a lower cover, numeral 41 denotes a front cover, numeral 42 denotes an upper cover, numeral 43 denotes a right cover (or a door) which can be opened or closed, numeral 44 denotes a left cover, numeral 45 denotes a lever for opening or closing the right cover, and numeral 46 denotes a lever for opening or closing an upper unit. In FIG. 2, reference numerals 47 and 49 denote circuit boards on which printer circuits for controlling the operation of printer apparatus 1 are formed, and numeral 48 denotes three circuit boards on which printer controlling circuits for controlling the printer circuits are formed. (In other words, circuit boards 48 constitute a printer control section.) Three connectors (not shown) are attached to the ends of three circuit boards 48, respectively, thereby constituting IC card-insertion ports 11 adapted for insertion of IC cards 65, 66 and 67 (FIG. 4).

To form an image, photosensitive body 15 is rotated and uniformly charged by charging unit 16. Then, laser system 17 partially exposes photosensitive body 1 to light on the basis of image signals, thereby forming an electrostatic latent image on photosensitive body 15. Developing unit 18 develops the electrostatic latent image on photosensitive body 15 by use of a two-component developer containing toner and carrier, and the developer image, thus obtained, is conveyed to image transfer section 23.

Simultaneous with the formation of the developer image, paper sheet P, which is automatically taken out of paper sheet cassette 25 o manually inserted from manual insertion tray 13, is conveyed to image transfer section 23. At this image transfer section, transfer unit 19 transfers the developer image from photosensitive body 15 to paper sheet P. Thereafter, separation unit 20 separates the paper sheet from photosensitive body 15 and then the paper sheet is conveyed to fixing unit 31 along image support transportation path 24. After the fused fixing of the developer image to paper sheet P, paper sheet P is conveyed from fixing unit 31 to discharge paper selector 32. By this selector, the discharge direction of paper sheet P is determined thus, paper sheet P is directed to either paper discharge tray 8 or tray 12.

After the developer image is transferred to paper sheet P, photosensitive body 15 is cleared of its residual toner by cleaning unit 21, so that photosensitive body 15 is ready for the next copying operation.

FIG. 4 is a block circuit diagram showing the main portion of the electric circuit of printer control section 48. Referring to FIG. 4, CPU 50 controls the entire image forming apparatus. ROM 51 stores a control program, on the basis of which CPU 50 operates. ROM 51 also stores identification number data (ID number data) which is checked when data is altered. It further stores data regarding paper sheet P, such as the data representing the right margin, left margin, paper type, etc. RAM 52 is used as a page buffer for temporarily storing image data supplied from host apparatuses 58. (In FIG. 4, only one host apparatus is illustrated for simplicity.) RAM 52 is also used as a work buffer of CPU 50. Expanded memory 53 is a large-capacity memory and is used if the amount of image data supplied from host apparatus 58 is large, as in the case of bit map data, and if RAM 52 cannot store one-page data of the supplied image data. Video RAM 54 is used as a scan buffer for storing image data developed as a bit image, and the image data output from this video RAM is supplied to serial-parallel conversion circuit 55. Serial-parallel conversion circuit 55 converts the image data (which is developed as a bit image in video RAM 54 and is supplied to conversion circuit 55 as parallel data) into serial data, and supplies the converted serial data to printer circuits 47 and 49.

Host interface 57 transfers data between host apparatus 58 and printer control section 48. Transfer line 59, which connects interface 57 and host apparatus 58 to each other, comprises two types of lines, namely a serial transfer line and a parallel transfer line. One of these lines is selectively used in accordance with the type of data transferred between host apparatus 58 and interface 57. Details of the host interface will be explained more fully later.

Printer interface 60 is provided in the control signal line between printer control section 48 and printer circuits 47 and 49. The detection signal of paper sheet detector 26 is supplied to CPU 50 through this printer interface.

Operating panel-controlling circuit 56 controls operating panel 9 such that a guide message is correctly shown on LCD 9a, such that LED displays 9b are correctly turned on or off or are correctly flickered, and such that the data entered through switches 9c is reliably supplied to CPU 50. Internal bus 61 is a bus through which data is transferred between the following elements: CPU 50, ROM 51, RAM 52, expanded memory 53, video RAM 54, operating panel-controlling circuit 56, host interface 57, printer interface 60, and IC cards 65–67.

IC cards 65–67 are volatile memories and are made of battery-backup type static RAMs, $E^2PROMs$, EPROMs, mask ROMs, or the like. The IC cards are colored in accordance with the memory types and the data which they store. For instance, an IC card made of a mask ROM and storing fonts is colored in blue, an IC card made of a static RAM and storing emulation data is colored in orange, etc. Therefore, the memory types and the data stored in IC cards 65–67 are readily known by merely glancing at the IC cards.

Figure 5:
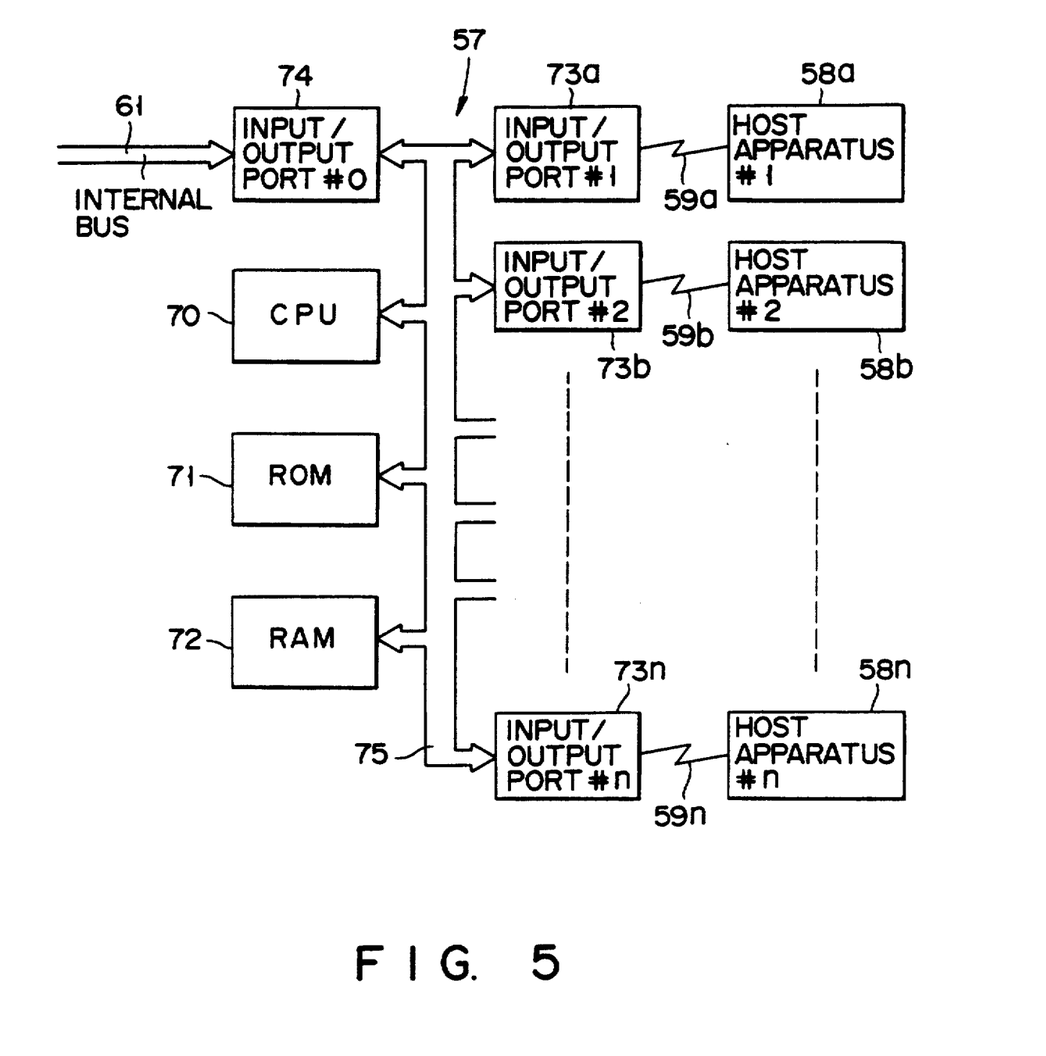
FIG. 5 is a block circuit diagram showing the main portion of the electric circuit of a host interface.

As is shown in FIG. 5, host interface 57 comprises: CPU 70; ROM 71; RAM 72; input/output port 73a, 73b, ..., 73n respectively connected to host apparatuses 58a, 58b, ..., 58n; input/output port 74 connected to internal bus 61; and external bus 75 for connecting these elements together.

Referring to FIG. 5, CPU 70 (which serves as both a selecting means and an interruption means) controls the whole of host interface 57. ROM 71 stores a control program, on the basis of which CPU 70 operates. RAM 72 (which serves as a storage means) temporarily stores data supplied from host apparatus 58. It is also used as a work buffer of CPU 70, and is further used for storing a priority order table representing the priority orders of input/output ports 73a, 73b, ..., 73n. In the case illustrated in FIG. 5, input/output port #1 is defined as having priority order n (i.e., the lowest priority order), and input/output port #2 is defined as having priority order 2 (i.e., the second priority order). (See FIG. 5)

Input/output ports 73a, 73b, ..., 73n each serve as a connection means, and host apparatuses 58a, 58b, ..., 58n are connected to the respective input/output ports. The input/output ports and the host apparatuses are connected by means of transfer lines 59a, 59b, ..., 59n, respectively. As mentioned above, each of transfer lines 59a, 59b, ..., 59n comprises both serial and parallel transfer lines, and these two types of transfer lines are used in accordance with the type of data to be transmitted.

Input/output port 74 connects host interface 57 to internal bus 61 of printer control section 48. In host interface 57, one of input/output port 73a, 73b, ..., 73n is selected in accordance with the priority orders, and data is supplied from the selected input/output port to RAM 52 etc. of printer control circuit 48. This data is supplied through input/output port 74. Further, input/output port 74 receives data from printer control circuit 48 and sends this data to CPU 70.

The priority orders are set as described below.

Figure 6:
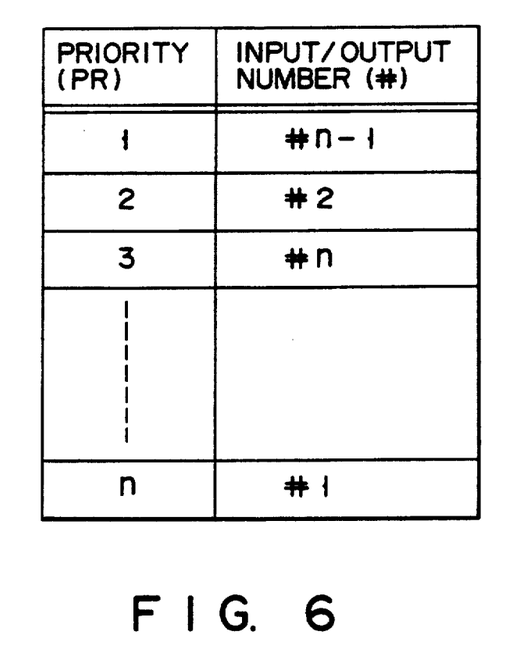
FIG. 6 shows an example of a priority order table.

The contents in the priority order table, shown in FIG. 6, can be freely altered by operating switches 9c of operating panel 9. To alter the contents, the operator follows the procedures below.

First, the operator cyclically changes what is shown in the message display region on the left side of LCD 9a by operating either the "NEXT ITEM" key or the "PRECEDING ITEM" key of the menu key of operating panel 9, until the message "PORT SEQ n:" used for setting the priority order of input/output port #n is shown in the message display region. In the state where the message "PORT SEQ n:" is displayed in the message display region, the operator cyclically changes the priority order shown in the input region on the right side of LCD 9a by operating either the "NEXT ITEM" key or the "PRECEDING ITEM" key of the value key, until the priority order desired by the operator by the operator, e.g., "1", is shown in the input region. In the state where the desirable priority order "1" is shown in the input region, the operator depresses the input key. By depressing the input key, the desirable priority order "1" is read by control circuit 56, and is then supplied, via internal bus 61 and input/output port 73a, to CPU 70 of host interface 57 under the control of CPU 50. Thereafter, under the control of CPU 70, the desirable priority order is stored in the priority order table of RAM 72, in association with the input/output port number selected with the menu key. In this fashion, input/output port "n" is defined as having priority order "1". By following similar procedures, the priority orders of the other input/output ports can be set and stored in the priority order table.

In the case of the image forming apparatus of the present invention, the way of setting priority orders is not limited to the above-mentioned procedures. The apparatus further comprises a means for giving the highest priority order to any one of the input/output ports by interrupting the predetermined priority orders. For this purpose, the operator cyclically changes what is shown in the message display region on the left side of LCD 9a by operating either the "NEXT ITEM" key or the "PRECEDING ITEM" key of the menu key, until the message "INT PORT:" (which is used for setting a high priority order to a particular input/output port) is shown in the message display region. In the state where the message "INT PORT:" is displayed in the message display region, the operator cyclically changes the priority order shown in the input region on the right side of LCD 9a by operating either the "NEXT ITEM" key o the "PRECEDING ITEM" key of the value key, until a high priority order desired by the operator, e.g., "n", is shown in the input region. In the state where the desirable priority order "n" is shown in the input region, the operator depresses the input key. By depressing the input key, the desirable priority order "n" is read by control circuit 56, and is then supplied, via internal bus 61 and input/output port 73a, to CPU 70 of host interface 57 under the control of CPU 50. Thereafter, under the control of CPU 70, the image data corresponding to the input/output ports starting from the input number "n" is supplied to printer control section 48, prior to the image data corresponding to the other input/output ports.

At this time, the operator can select whether the image data corresponding to the input/output ports starting from the input number "n" should be supplied after the end of the processing performed then, or whether the image data should be supplied, with the processings interrupted. In other words, the operator chooses whether he would like to wait for the processings to be completed before starting the supply of the image data, or whether he would like to interrupt the processings to start the supply of the image data (a predetermined time is required before the interruption of the processings). Hereinafter, the former case will be referred to as a "EOJ" mode, and the latter case will be referred to as a "TIMER" mode. The operator can designate one of these modes by use of operating panel 9. More specifically, the operator cyclically changes what is shown in the message display region on the left side of LCD 9a by operating either the "NEXT ITEM" key or the "PRECEDING ITEM" key of the menu key, until the message "BLOCK:" used for designating the switching timings of the input/output ports is shown in the message display region. In the state where the message "BLOCK:" is displayed in the message display region, the operator cyclically changes the mode-indicating message shown in the input region on the right side of LCD 9a by operating either the "NEXT ITEM" key or the "PRECEDING ITEM" key of the value key, until the message desired by the operator, e.g., "EOJ", is shown in the input region. In the state where the desired message "EOJ" is shown in the input region, the operator depresses the input key. By depressing the input key, the input message "EOJ" is read by control circuit 56, and is then supplied, via internal bus 61 and input/output port 73a, to CPU 70 of host interface 57 under the control of CPU 50. Thereafter, under the control of CPU 70, the designated input/output port is enabled at the end of the processings or job which is then being performed, i.e., at the time when an EOJ code designating the end of the job has been supplied.

Figure 7:
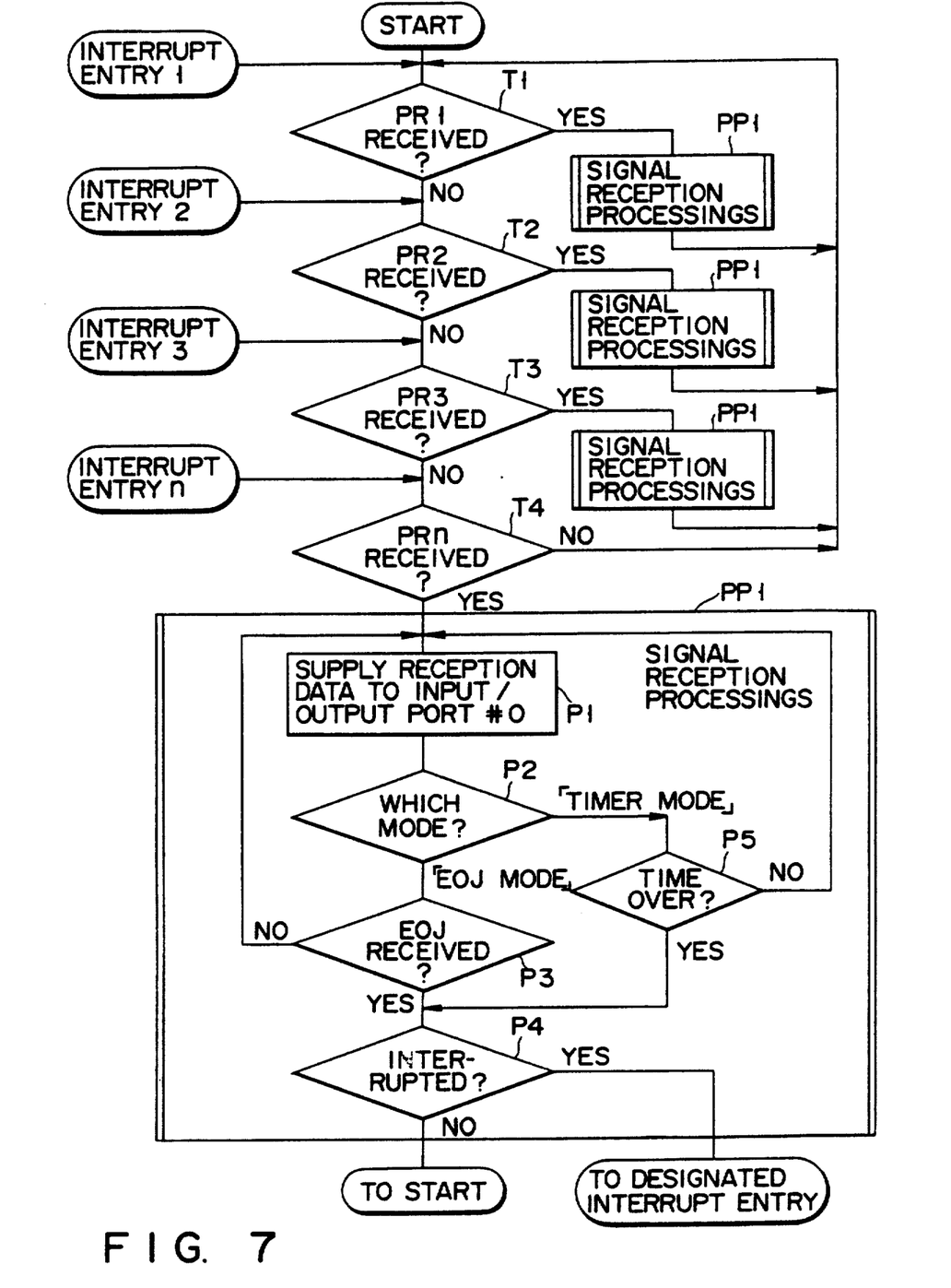
FIG. 7 is a flow chart for explaining the operation of the host interface.

A description will now be given, with reference to the flow chart shown in FIG. 7, as to how the image forming apparatus is accessed by each of host apparatuses 58a, 58b, . . . , 58n.

First of all, in Step T1 it is determined whether or not input/output port #n-1, which has the first priority order, has received data (PR1 reception), while referring to the priority order table (FIG. 6) provided in RAM 72. If it is determined that input/output port #n-1 has not received any data, then the flow advances to Step T2. In Step T2, it is determined whether or not input/output port #2, which has the second priority order, has received data (PR2 reception). Similarly, it is checked, on the basis of the priority orders stored in the priority order table, whether or not the remaining output ports have received data. If, after examining data reception with respect to input/output port #1 having the lowest priority order (Step T4), it is found out that each input/output port does not receive any data, then the flow returns to Step T1, so as to repeat the same checks. The checks are repeated until data is received at one of the input/output ports.

Let it be assumed that, in Step T2, input/output port #2 having the second priority order receives data. In this case, the data received by input/output port #2 is supplied to input/output port #0 (Step P1). Under the control of CPU 50, the data is then supplied from input/output port #0 to RAM 52, via internal bus 61 of printer control section 48, and is stored in RAM 52. Next, in Step P2, a check is made with respect to the mode that determines the switching timings of input/output ports. If it is determined in Step P2 that the mode is the "EOJ" mode, then the flow advances to Step P3, in order to check whether or not the reception data is an EOJ code. If the reception data is not the EOJ code, it is determined that the data transfer has not yet been completed. Therefore, the flow returns to Step P1 to repeat the same procedures, and the data reception and the data supply to input/output port #0 are repeated until the EOJ code is received. When this EOJ code has been received, the flow advances to Step P4. If it is determined in Step P2 that the mode is the "TIMER" mode, the flow advances to Step P5, to check whether or not a time preset for the data transfer is over. More specifically, a certain time is preset for the transfer of each image data, and a timer (not shown) starts counting from the start of the data transfer. By use of the timer, it is determined in Step P2 whether or not the image data is transferred within the preset time. If the data transfer is determined as having been performed within the prescribed time, the flow returns to Step P1 to repeat the above procedures, and the data reception and the data supply to input/output port #0 are repeated until a "time over" state is detected. If this "time over" state is detected, the data transfer is stopped, and the flow advances to Step P4.

In Step P4, it is checked whether or not interruption has been commanded. If the interruption is not commanded, the data reception processings are stopped. In this case, the flow returns to Step T1, and the above procedures are repeated until data is received at one of the input/output ports.

If it is found out in Step P4 that interruption has been commanded, the flow branches to the processings for the input/output port or ports which should be selected prior to the others. In other words, the flow branches to one of interrupt entries 1 to n. Since it is natural that the input/output port or ports designated by the interruption receive data, data reception processings are performed with respect to the ports. This means that the data reception processings with respect to the input/output ports designated by the interruption are carried out, prior to any other data reception processings.

As mentioned above, according to the present invention, the priority orders of input/output ports 73a, 73b, . . . , 73n to which host apparatuses 58a, 58b, . . . , 58n are respectively connected can be freely set or altered by use of operating panel 9. Therefore, the connections of cables 59a, 59b, . . . , 59n need not be changed even in the case where the priority orders of input/output ports 73a, 73b, . . . , 73n are altered. Therefore, the priority orders of the host apparatuses connected to input/output ports 73a, 73b, . . . , 73n can be easily set or altered, thus providing for efficient use.

Even when the apparatus is operating in accordance with the predetermined priority orders, interruption of the processings can be commanded, so as to select any one of the input/output ports 73a, 73b, . . . , 73n. Therefore, a particular host apparatus can be temporarily used, prior to the others.

In the above fashion, image data is received from the input/output port selected by host interface 57. The image data is developed as bit map data and is then supplied to the printer for the formation of an image. A description will now be given of this image forming operation, with reference to the data transfer processings shown in FIG. 9.

Figure 9:
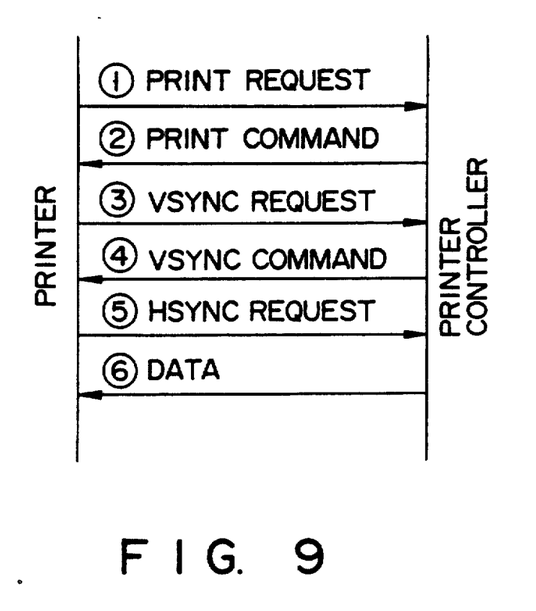
FIG. 9 shows how data transfer is performed.

First, a description will be given as to how data transfer is performed between printer circuits 47 and 49 and printer control section 48. FIG. 9 shows the procedures performed for this data transfer. (1) When the printer becomes ready for printing, a print request is made by the printer. (2) If, at this time, image data to be printed is already prepared, printer control section 48 supplies a print command to the printer in response to the print request. (3) In response to the print command, the printer outputs a VSYNC request that requests synchronization in the vertical direction, i.e., in the conveyance direction of paper sheet P. (4) In response to the VSYNC request, printer control section 48 supplies a VSYNC command to the printer. This VSYNC command determines the timing at which laser system 17 starts forming an electrostatic latent image on photosensitive body 15 and is output when paper sheet P, supplied from either paper sheet cassette 25 or manual insertion tray 13, has reached a predetermined point in image support transportation path 24. This point is determined in such a manner that the time which is required for paper sheet P to be conveyed from that point to image transfer section 23 is the same as the time which is required for the electrostatic latent image formed on photosensitive body 15 to reach image transfer section 23 after being developed by developing unit 18. (5) Next, the printer which receives the VSYNC command supplies a HSYNC request to printer control section 48, after laser system 15 is brought to its initial position with respect to the horizontal direction, i.e., the direction perpendicular to the conveyance direction of paper sheet P. (6) In response to the HSYNC request, printer control section 8 supplies the image data, which is developed in the form of a bit image, to the printer. After the image data corresponding to one page is transferred in this fashion, the image forming operation is stopped.

Figure 8A:
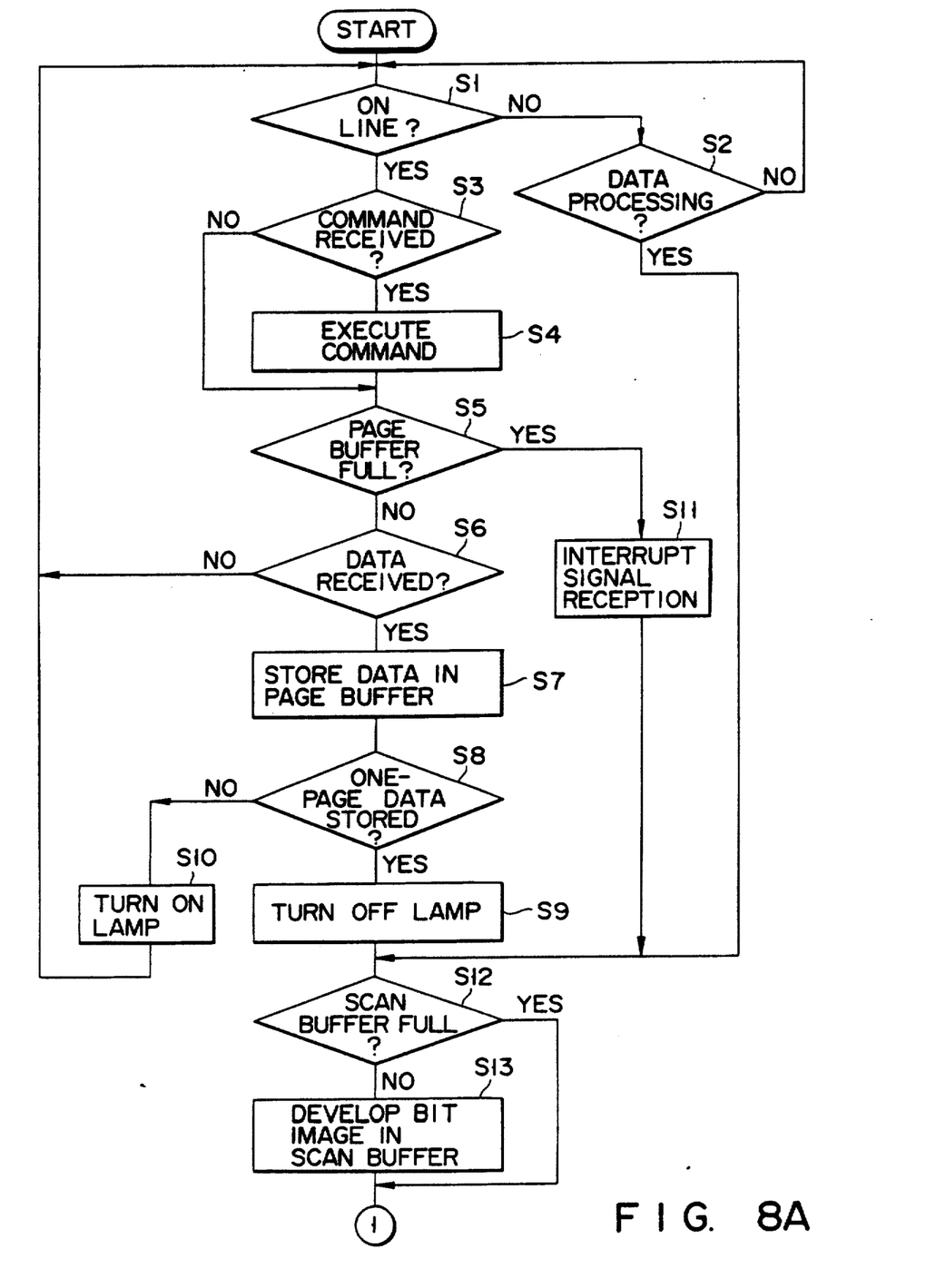
FIGS. 8A and 8B are flow charts for explaining the operation of the printer control section.
Figure 8B:
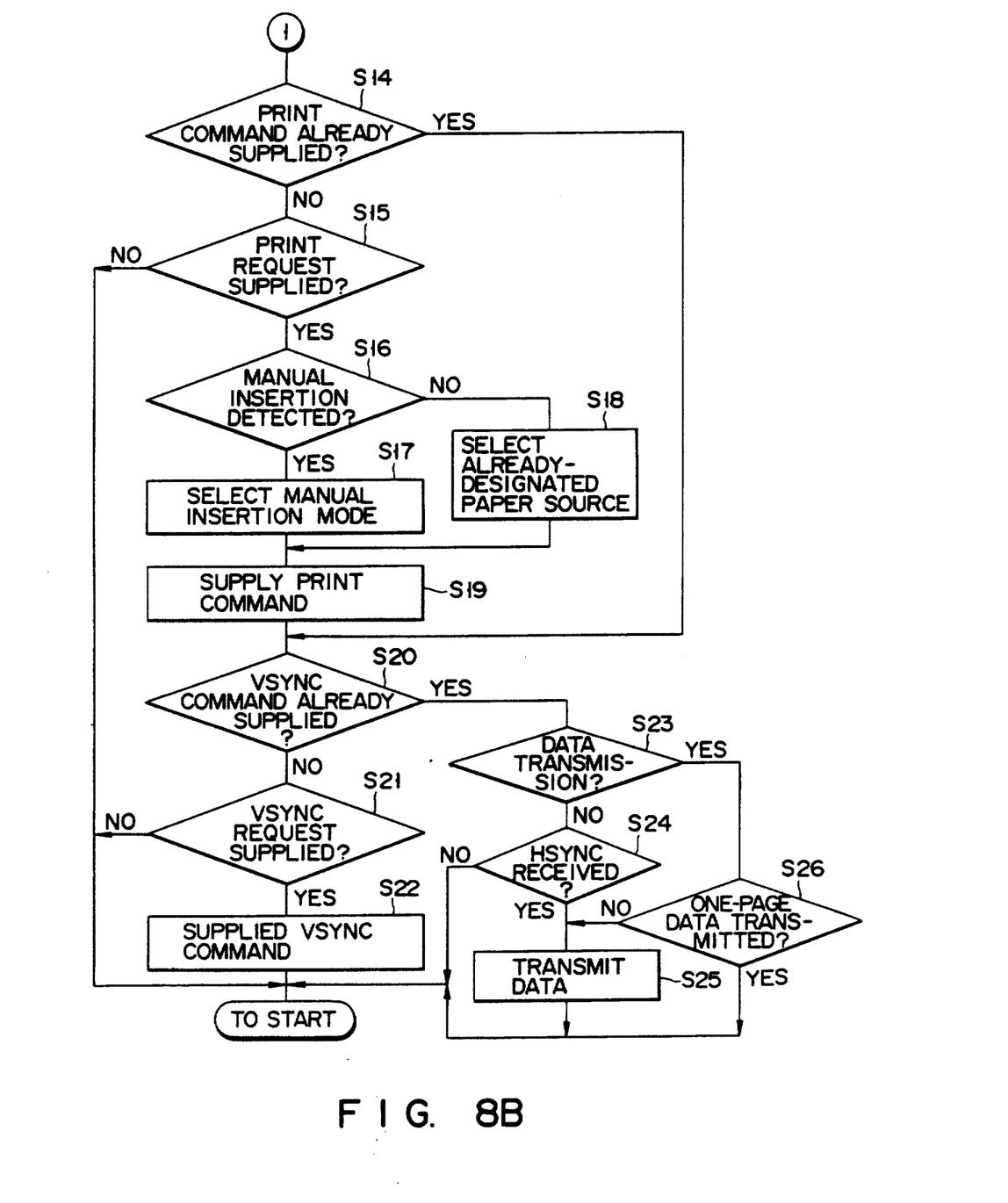

Next, a detailed description will be given, with reference to the flow charts shown in FIGS. 8A and 8B, as to how printer control section 48 operates by utilization of the data transfer mentioned above.

Let it be assumed that the image forming apparatus is in the off-line state. If CPU 50 determines in Step S1 that the apparatus is in the off-line state, a check is made in Step S2 to see whether or not the printing of the image data supplied from host apparatus 58 has been finished. If the printing has not yet been finished, the flow advances to Step S2 to continue the printing. If the printing has been finished, then Steps S1 and S2 are repeatedly executed, whereby the apparatus is set in an "idling condition" and waits for the on-line state.

If CPU 50 determines in Step S1 that the image forming apparatus is in the on-line state, then a check is made in Step S3 to see whether or not the data supplied from host apparatus 58 is a command. If the data is a command, the apparatus performs the operation corresponding to the command (Step S4). If the data is not a command, the flow advances to Step S5, skipping Step S4. The command mentioned above is for determining the attributes of the succeeding data and for executing such printer control as does not need data exchange. In Step S5, a check is made to see whether or not the page buffer, which is provided in RAM 52 as a data reception buffer, is full. If the page buffer is not full, a check is made in Step S6 whether or not the data supplied from host apparatus 58 is image data. If the data is not image data, then the flow returns to Step S1, and the above steps are repeatedly executed until either a command or image data is received. If, in this condition, it is determined in Step S6 that image data has been received, the received image data is stored in the page buffer (Step S7). Next, a check is made in Step S8 to see whether or not image data corresponding to one page has been stored in that page buffer. If the one-page image data has not yet been stored, the "DATA" lamp included in LED displays 9b of operating panel 9 is made to flicker (Step S10). The flow then returns to Step S1, and the above steps are repeatedly executed until the one-page image data is stored in the page buffer. If, in this condition, it is determined that the one-page image data has been stored in the page buffer, the "DATA" lamp is turned off (Step S9) and the data receiving processings are stopped. Thereafter, the flow advances to the printing processings starting from Step S12. If it is determined in Step S5 that the page buffer is full, the data receiving processings are stopped (Step S11), and the flow advances to the printing processings starting from Step S12. If the "DATA" lamp did not flicker but instead uncontinuously lit, it would be impossible for the operator to know whether the data is still being transferred or whether something is wrong with the apparatus. In the present invention, however, the "DATA" lamp flickers while the data receiving processings are being performed, so that the operator readily may identify the condition of the apparatus.

When the one-page image data has been stored in the page buffer, a check is made in Step S12 to see whether or not the scan buffer, which is provided in video RAM 54, is full. If it is determined that the scan buffer is not full, the image data stored in the page buffer is converted from a character image to a bit image under the control of CPU 50, and the converted image data is stored in video RAM 54 (Step S13). If it is determined that the scan buffer is full, the flow advances to Step S14, skipping Step S13. In Step S14, a check is made to see whether or not a print command has been already issued. If the print command has already been issued, then the flow advances to Step S20, skipping Steps S15 through S19 (in these steps, the processing for issuing a print command is performed). If the print command has not yet been issued, a check is made in Step S15 to see whether or not the printer has already output a print request. If no print request has been outputted, it is determined that the printer is not ready for printing. Thus, the flow returns to Step S1, and the above steps are executed once again until a print request is output by the printer. If the print request has been outputted, a check is made in Step S16 to see whether paper sheet P has been conveyed from paper sheet cassette 25 or from manual insertion tray 13. Specifically, a check is made to see whether or not paper sheet detector 26 at the bottom of manual insertion tray 13 has detected a paper sheet. If paper sheet detector 26 has detected a paper sheet, it is determined in Step S17 that paper sheet has been manually inserted through tray 13. Therefore, paper feed roller 29a is driven to guide paper sheet P from manual insertion tray 13 to image transfer section 23. If no paper sheet is detected by paper sheet detector 26 in Step S16, it is determined in Step S18 that paper sheet P has been conveyed from paper sheet cassette 25. Therefore, paper feed roller 29b is driven to guide paper sheet P from paper sheet cassette 25 to image transfer section 23 (Step S18).

After identifying the supply source of paper sheet P in the above manner, a print command is supplied to the printer (Step S19). Next, a check is made in Step S20 to see whether a VSYNC command has already been issued. If the VSYNC command has not yet been issued, a check is made in Step S21 to see whether or not the printer has already outputted a VSYNC request. If the VSYNC request has not yet been outputted, the flow returns to Step S1, and the above steps are executed once again until a print request is made by the printer. If it is determined in Step S21 that a print request has been made by the printer, a VSYNC command is supplied to the printer in Step S22, so that the printer is supplied with the information representing the timings at which an electrostatic latent image is formed with laser system 17. In this condition, the flow returns to Step S1 to wait for the printer to output an HSYNC request.

If it is determined in Step S20 that the VSYNC command has already been outputted, then a check is made in Step S23 to see whether or not data is being transferred. If the data is not being transferred, a check is made in Step S24 to see whether an HSYNC request has been made by the printer. If the HSYNC request has not yet been made, the flow returns to Step S1, and the above steps are executed once again until the HSYNC request is made. If it is determined in Step S24 that the HSYNC request has been made, then the image data stored in the scan buffer in the form of a bit image is supplied to printer circuits 47 and 49 synchronously with predetermined timings (Step S25). As a result, laser system 17 starts forming an electrostatic latent image. Simultaneously, the flow of CPU 50 returns to Step S1, and the above steps are once again executed until the transfer of the one-page image data is completed. The data transmission is continued until it is determined in Step S23 that data transfer is being performed and until it is determined in Step S26 that the transfer of one-page image data has been completed. After the transmission of the one-page image data, the flow returns to Step S1, and printer control section 48 is brought into the initial condition and thus becomes ready for the transfer of the image data corresponding to the next page.

By repeating the above operation, an image corresponding to a plurality of pages is formed.

As may be understood from the above, if paper sheet detector 26 detects paper sheet P fed from manual insertion tray 13, the supply of paper sheets P from paper sheet cassette 25 is suspended, so as to automatically convey paper sheet P from manual insertion tray 13 toward image transfer section 23. Therefore, it is not necessary to use operating panel 9 even when paper sheet P is manually inserted from manual insertion tray 13. Since, therefore, an image can be easily printed on the manually-inserted sheet, the apparatus can be easily handled.

While image data is being transferred between host apparatus 58 and the image forming apparatus, the "DATA" lamp included in LED displays 9b continues to flicker, thereby informing the operator that the data transfer is being performed. Even if CPU 50 is used for a long time, the operator easily understands that the data transfer is being performed. Therefore, the apparatus of the present invention easily monitored for operability.

The memory of IC card 65, 66 or 67 stores data of various kinds, such as font data, emulation data, image data, etc. The image data pertains to a normalized table, a chart, and a sentence, and image data of either one kind or a plurality of kinds is stored in one IC card. The operator inserts an IC card storing this image data into one of IC card-insertion ports 11, and then operates either the "NEXT ITEM" key or the "PRECEDING ITEM" key of the menu key until the message "LOAD CARD nm", is shown on the message display region on the left side of LCD display 9a (the message "LOAD CARD nm" is used for reading the m-th image information stored in the n-th IC card [65, 66, or 67]). In this condition, the operator operates either the "NEXT ITEM" key or the "PRECEDING ITEM" key of the value key until a message (e.g., "YES") for commanding the start of a read operation is displayed. In this fashion, the image data is transferred from the IC card to the image forming apparatus.

Figure 10:
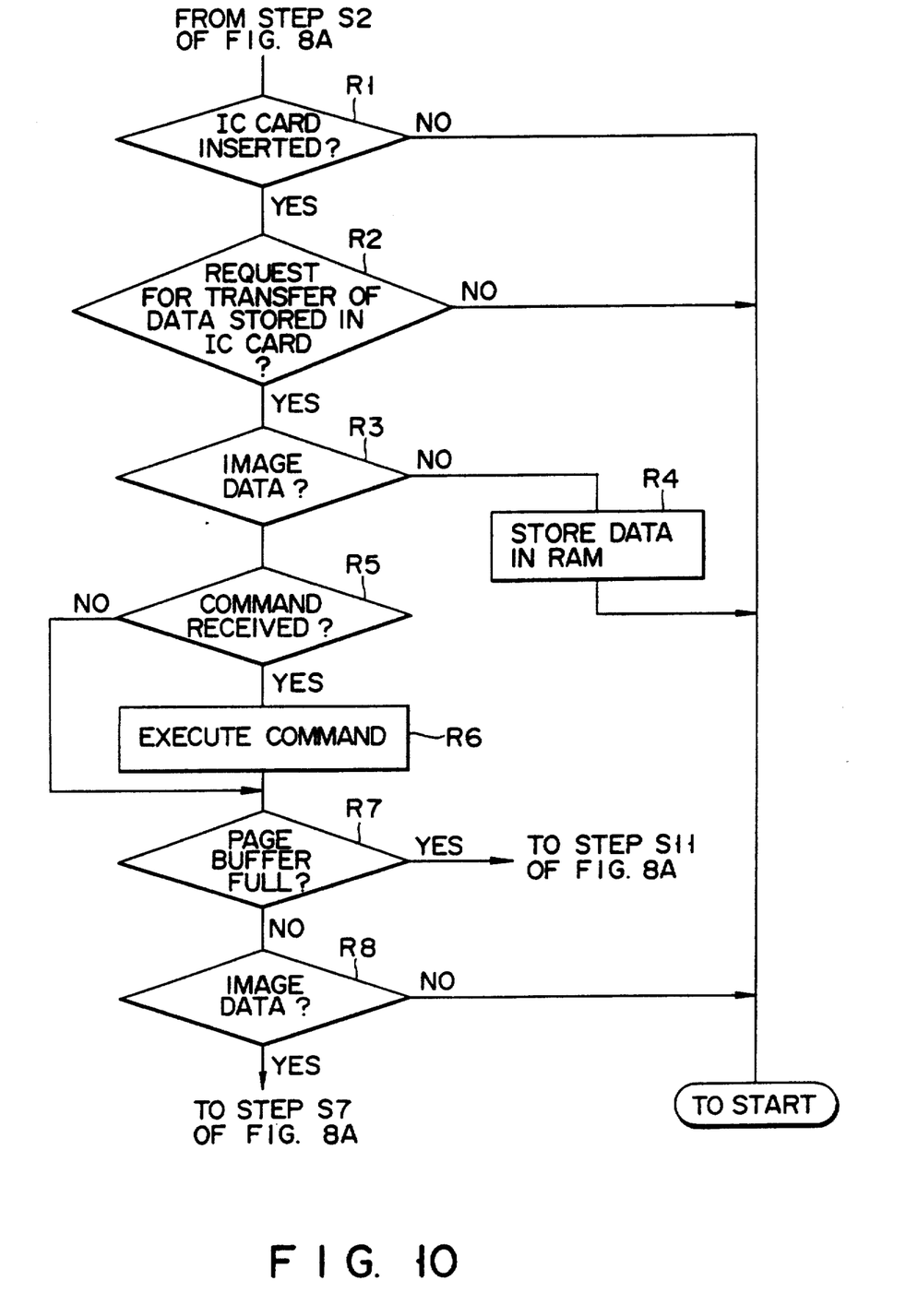
FIG. 10 shows a flow chart for explaining the operation in the case of using an IC card.

A description will be given, with reference to the flow chart shown in FIG. 10, as to how image data is transferred from an IC card to the image forming apparatus described above.

First of all, a code stored in the ROM of the IC card is checked in Step R1, so as to confirm the inserted condition of the IC card. If the inserted condition of the IC card is confirmed in Step R1, then a check is made in Step R2 to see whether or not a data transfer request for transferring the data from the IC card to the image forming apparatus has been made. If the inserted condition of the IC card is not confirmed or if no data transfer request is made, the flow returns to Step S1. Let it be assumed that the inserted condition of the IC card is confirmed and that a data transfer request for requesting the transfer of the first data stored in the first IC card is made. In this case, a data type determination code stored in the ROM of the IC card is checked in Step R3. If the data is not image data, it is supplied to RAM S2 via internal bus 61 and is stored in RAM 52. Thereafter, the flow returns to Step 1. If the data is image data, a check is made in Step R5 to see whether or not the data having been transferred from IC card 65 is a command. If the data from IC card 65 is a command, then the operation corresponding to the command is executed in Step R6. If not, the flow advances to Step R7, skipping Step R6. In Step R7, a check is made to see whether or not the page buffer, provided in RAM 52 as a data receiving buffer, is full. If this page buffer is not full, a check is made in Step R8 to see whether or not the data from IC card 65 is image data. If the data is not image data, the flow returns to Step S1, and the above-mentioned procedures are repeated until the end of the transfer of the data stored in the designated IC card. If, in Step R8, the data from IC card 65 is image data, Steps S7 through S26 mentioned above are executed.

As mentioned above, the image forming apparatus of the present invention can form an image stored in an IC card, without depending on any of the host apparatuses.

IC cards 65–67 used in the image forming apparatus of the present invention are colored in accordance with the memory types and with the contents stored therein. Therefore, the IC cards can be used without confusion.

As mentioned above, the image forming apparatus provided by the present invention enables the priority orders of the host apparatuses to be easily altered and further enables a particular host apparatus to be selected for temporary priority use.

It should become obvious to those skilled in the art that this invention is not limited to the preferred embodiments shown and described.

What is claimed is:

1. An image forming apparatus for forming an image on an image formation medium from image data received from a plurality of host apparatuses, each image forming apparatus comprising:
   a plurality of means connected to the respective host apparatuses to receive image data from the host apparatuses;
   means for setting an order of priority for each of the plurality of connection means, the setting means including:
   first operating means for selecting the desired connection means, the first operating means including first key means for changing information incrementally or decrementally as to the connection means;
   second operating means for setting a priority order of the selected connection means, said second operating means including second key means for changing information incrementally or decrementally on the order of priority; and display means for indicating the selected connection means together with the priority order thereof, said display means including a message display region on which the information as to the connection means is displayed, and an order display region on which the information on the order of priority is displayed;
   means for storing the priority order set by the setting means;
   means for sequentially selecting each of the plurality of connection means in accordance with the order of priority stored in the storing means if data is received simultaneously from two or more of the host apparatuses; and
   means for sequentially receiving image data in the order of priority from the connection means selected by the selecting means and forming images corresponding to the image data sequentially received from the connection means.

2. The image forming apparatus as claimed in claim 1, further including:
   interruption setting means for interrupting selection of the connection means; and
   interruption executing means, which operate if the selection of the connection means is interrupted by the interruption setting means, for supplying image data received at the connection means designated by the interruption setting means to the image forming means, prior to the image data received at the connection means selected by the selecting means, and for causing the image forming means to form an image corresponding to the image data received from the connection means designated by the interruption setting means.

3. An image forming apparatus, comprising:
   a plurality of means for connecting to a plurality of host apparatuses to receive image data from the host apparatuses;
   means for setting the order of priority of each of the plurality of connection means;
   means for storing the order of priority set by the setting means;
   means for sequentially selecting the connection means in accordance with the order of priority stored by the storing means;
   means for receiving image data from the connection means selected by the selecting means and for forming an image corresponding to the image data;
   at least one IC card for storing a signal, on the basis of which image data is to be modified into image data of a predetermined form; and
   means for modifying the image data supplied from the connection means on the basis of the signal stored in the IC card and for supplying the modified image data to the image forming means.

4. An image forming apparatus according to claim 1, wherein said image forming means includes memory means for storing received image data page by page, and means for indicating whether or not image data corresponding to one page is stored in the memory means.

5. An image forming apparatus according to claim 2, wherein said interruption executing means includes means for causing the image forming means to form an image corresponding to the image data supplied from the connection means designated by the interruption setting means, after the image forming means forms a one-cycle image in accordance with the priority orders set by the selecting means but before the image forming means starts forming a next-cycle image.

6. An image forming apparatus according to claim 2, wherein said interruption executing means includes means for causing the image forming means to form an image corresponding to the image data supplied from the connection means designated by the interruption setting means, without reference to image formation performed on the basis of the priority orders set by the selecting means and when a predetermined time has elapsed from the setting by the interruption setting means.

* * * * *